United States Patent
Chen et al.

(10) Patent No.: US 11,715,283 B2
(45) Date of Patent: Aug. 1, 2023

(54) IMAGE PROCESSING METHOD AND IMAGE PROCESSING SYSTEM

(71) Applicant: DELTA ELECTRONICS, INC., Taoyuan (TW)

(72) Inventors: Kuan-Wen Chen, Taoyuan (TW); Po-Heng Chen, Taoyuan (TW); Zhao-Xu Luo, Taoyuan (TW); Yi-Ting Huang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 275 days.

(21) Appl. No.: 17/238,138

(22) Filed: Apr. 22, 2021

(65) Prior Publication Data
US 2021/0334583 A1  Oct. 28, 2021

(30) Foreign Application Priority Data
Apr. 27, 2020  (CN) .......................... 202010343996.1

(51) Int. Cl.
*G06V 10/77* (2022.01)
*G06V 10/44* (2022.01)
(Continued)

(52) U.S. Cl.
CPC .......... *G06V 10/443* (2022.01); *G06F 18/213* (2023.01); *G06F 18/214* (2023.01);
(Continued)

(58) Field of Classification Search
CPC .... G06V 10/443; G06V 10/74; G06V 10/761; G06V 10/7715; G06V 10/774;
(Continued)

(56) References Cited

U.S. PATENT DOCUMENTS 10,848,791 B1 * 11/2020 Germano ............... G11B 27/28
2018/0032840 A1 * 2/2018 Yu ......................... G06V 10/774
(Continued)

FOREIGN PATENT DOCUMENTS

CN  109190446 A  1/2019
CN  109558806 A  4/2019
(Continued)

OTHER PUBLICATIONS

J. Sivic and A. Zisserman. "Video google: A text retrieval approach to object matching in videos" In International Conference on Computer Vision (ICCV), pp. 1470-1477. 2003.
(Continued)

*Primary Examiner* — Aaron W Carter
(74) *Attorney, Agent, or Firm* — CKC & Partners Co., LLC

(57) ABSTRACT

An image processing method includes analyzing multiple images data based on Illumination-invariant Feature Network (IF-NET) with an image processing device to generate corresponding sets of eigenvector, in which image data includes a first image data related to at least one first feature of the sets of eigenvector, and a second image data related to at least one second feature of the sets of eigenvector; choosing a corresponding first training set of tiles and second training set of tiles from the first image data and second image data with an image processing device based on IF-NET, and computing on both training set of tiles to generate a least one loss value; and adjusting IF-NET based on a least one loss value. An image processing system is also disclosed herein.

16 Claims, 6 Drawing Sheets

500

(51) Int. Cl.
G06F 18/22 (2023.01)
G06F 18/213 (2023.01)
G06F 18/214 (2023.01)
G06V 10/74 (2022.01)
G06V 10/774 (2022.01)

(52) U.S. Cl.
CPC ............. *G06F 18/22* (2023.01); *G06V 10/74* (2022.01); *G06V 10/761* (2022.01); *G06V 10/774* (2022.01); *G06V 10/7715* (2022.01)

(58) Field of Classification Search
CPC ...... G06F 18/213; G06F 18/214; G06F 18/22; G06F 18/24
See application file for complete search history.

(56) References Cited

U.S. PATENT DOCUMENTS

| | | | |
|---|---|---|---|
| 2018/0165546 A1* | 6/2018 | Skans | G06N 3/084 |
| 2019/0102651 A1 | 4/2019 | Song et al. | |
| 2020/0372308 A1* | 11/2020 | Anirudh | G06N 3/088 |
| 2021/0124992 A1* | 4/2021 | Kim | G06F 18/214 |
| 2021/0334583 A1* | 10/2021 | Chen | G06F 18/22 |
| 2022/0129708 A1* | 4/2022 | Gamzo | G06V 10/82 |

FOREIGN PATENT DOCUMENTS

| | | |
|---|---|---|
| CN | 110647865 A | 1/2020 |
| JP | 2019-083002 A | 5/2019 |
| TW | 201822076 A | 6/2018 |
| WO | 2019/226686 A2 | 11/2019 |

OTHER PUBLICATIONS

F. Radenovic; G. Tolias; and O. Chum. "CNN image retrieval learns from BoW: Unsupervised fine-tuning with hard examples." In European Conference on Computer Vision (ECCV), pp. 3-20. 2016.

M. Brown and D. Lowe. "Automatic panoramic image stitching using invariant features." In International Journal of Computer Vision (IJCV), 74(1). 2007.

A. Kendall; M. Grimes; and R. Cipolla "Posenet: A convolutional network for real-time 6-DOF camera relocalization " In International Conference on Computer Vision (ICCV). 2015.

D. Mishkin; J. Matas; M. Perdoch; and K. Lene. "Wxbs: Wide baseline stereo generalizations" arXiv 1504.06603.2015.

J. L Schonberger and J.M. Frahm,"Structure-from-motion revisited", In IEEE International Conference on Computer Vision and Pattern Recognition (CVPR), pp. 4104-4113. 2016.

J. L. Schonberger; F. Radenovic; O. Chum; and J.M. Frahm, "From single image query to detailed 3D reconstruction", In IEEE International Conference on Computer Vision and Pattern Recognition (CVPR), pp. 5126-5134. 2015.

D. Lowe, "Distinctive Image Features from Scale-Invariant Keypoints", In International Journal of Computer Vision [IJCV], 20(2). 2004.

K. Mikolajczyk; T. Tuytelaars; C. Schmid; A. Zisserman; J. Matas; F. Schaffalitzky; T. Kadir; and L. J. V. Gool, "A comparison of affine region detectors", In International Journal of Computer Vision (IJCV), 65.2005.

J.Heinly; E.Dunn; and J.M.Frahm. 2012, "Comparative evaluation of binary features." In European Conference on Computer Vision (ECCV) 2017.

K. Mikolajczyk and C. Schmid, "A performance evaluation of local descriptors", IEEE Transactions on Pattern Analysis and Machine Intelligence (TPAMI), 27(10) :1615-1630. 2005.

Y. Jia and T. Darrell., "Heavy-tailed distances for gradient based image descriptors", Conference of Neural Information Processing Systems (NIPS), pp. 397-405, 2011.

P. Jain; B. Kulis; J. V. Davis; and I. S. Dhillon., "Metric and kernel learning using a linear transformation", Journal of Machine Learning Research (JMLR), 13:519-547, 2012.

B. Fan; Y. Tian; and F.Wu. L2-Net: Deep learning of discriminative patch descriptor in euclidean space. In CVPR, Jul. 21-26, 2017.

A. Mishchuk, D. Mishkin, F. Radenovie, Kiri Matas. "Working hard to know your neighbor's margins: Local descriptor learning loss.'" In Conference on Neural Information Processing Systems (NIPS). 2017.

Fahim Irfan Alam et al., "Triplet Constrained Deep Feature Extraction for Hyperspectral Image Classification," 2018 9th Workshop on Hyperspectral Image and Signal Processing: Evolution in Remote Sensing (WHISPERS), Sep. 23-26, 2018.

Xiankai Lu et al., "See More, Know More: Unsupervised Video Object Segmentation with Co-Attention Siamese Networks," 2019 IEEE/CVF Conference on Computer Vision and Pattern Recognition (CVPR), 11 pages, Jun. 2019.

* cited by examiner

IMAGE PROCESSING METHOD AND IMAGE PROCESSING SYSTEM

RELATED APPLICATION

The present application claims priority to China Application Serial Number 202010343996.1, filed on Apr. 27, 2020, which is incorporated herein by reference in its entirety.

BACKGROUND

Technical Field

The present disclosure is related to an image processing method and image processing system. More particularly, the present disclosure is related to an image processing method and image processing system configured to reduce light interference based on deep learning.

Description of Related Art

Feature matching is widely used in many fields of computer vision techniques, such as image retrieval, camera positioning, etc. The features of the image must remain invariant and unique under different image scales, image directions, viewing angle of the image, and image lighting.

SUMMARY

One aspect of the present disclosure is to provide an image processing method which includes: analyzing several images, by an image processing device, based on a feature extraction model to generate a feature vectors set, wherein the images include several first images correlated to at least one first feature vector of the feature vectors set and several second images correlated to at least one second feature vector of the feature vectors set; selecting corresponding first training blocks and corresponding second training blocks from the first images and the second images respectively, based on a feature extraction model, and performing calculation on the first training blocks and the second training blocks to generate at least one corresponding loss function value; and adjusting the feature extraction model according to the loss function value.

Another aspect of the present disclosure is to provide an image processing system including an image capturing device and an image processing device. The image capturing device is configured to capture several images. The image processing device coupled to the image capturing device is configured to analyze the images based on a feature extraction model to generate a feature vectors set, wherein the images include several first images correlated to at least one first feature vector of the feature vectors set and several second images correlated to at least one second feature vector of the feature vectors set; the image processing device selects corresponding first training blocks and corresponding second training blocks from the first images and the second images respectively, based on a feature extraction model, and performs calculation on the first training blocks and the second training blocks to generate at least one corresponding loss function value; the feature extraction model is adjusted according to the at least one loss function value generated by performing calculation on the first images and the second images.

As described above, the image processing method and image processing system in some embodiments of the present disclosure can improve matching proficiency when the outdoor lighting drastically changes.

It is to be understood that both the foregoing general description and the following detailed description are by examples, and are intended to provide further explanation of the disclosure as claimed.

DETAILED DESCRIPTION

Figure 1:
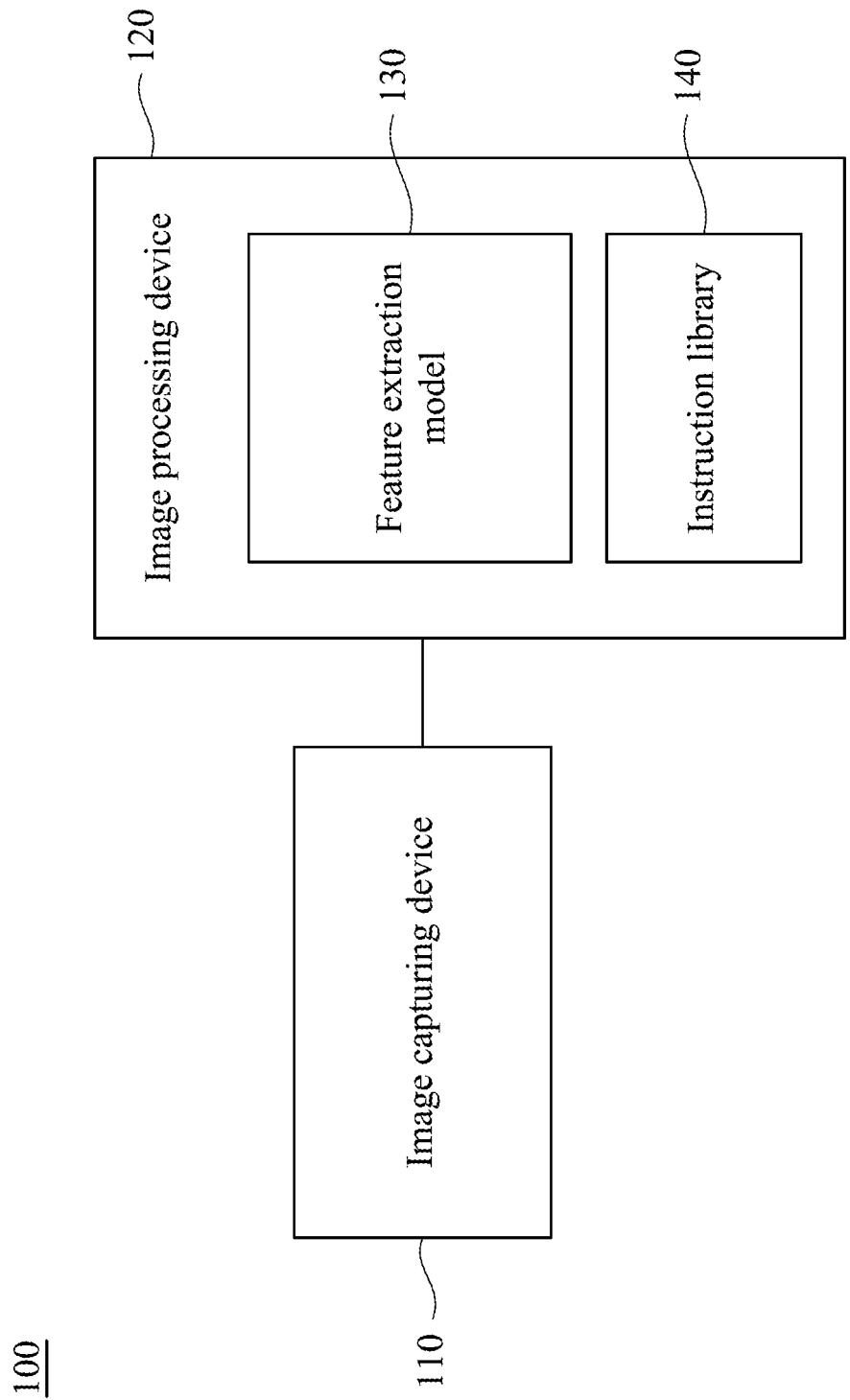
FIG. 1 is a schematic diagram of an image processing system, in accordance with some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts.

All the terms used in this document generally have their ordinary meanings. The examples of using any terms discussed herein such as those defined in commonly used dictionaries are illustrative only, and should not limit the scope and meaning of the disclosure. Likewise, the present disclosure is not limited to some embodiments given in this document.

Figure 3:
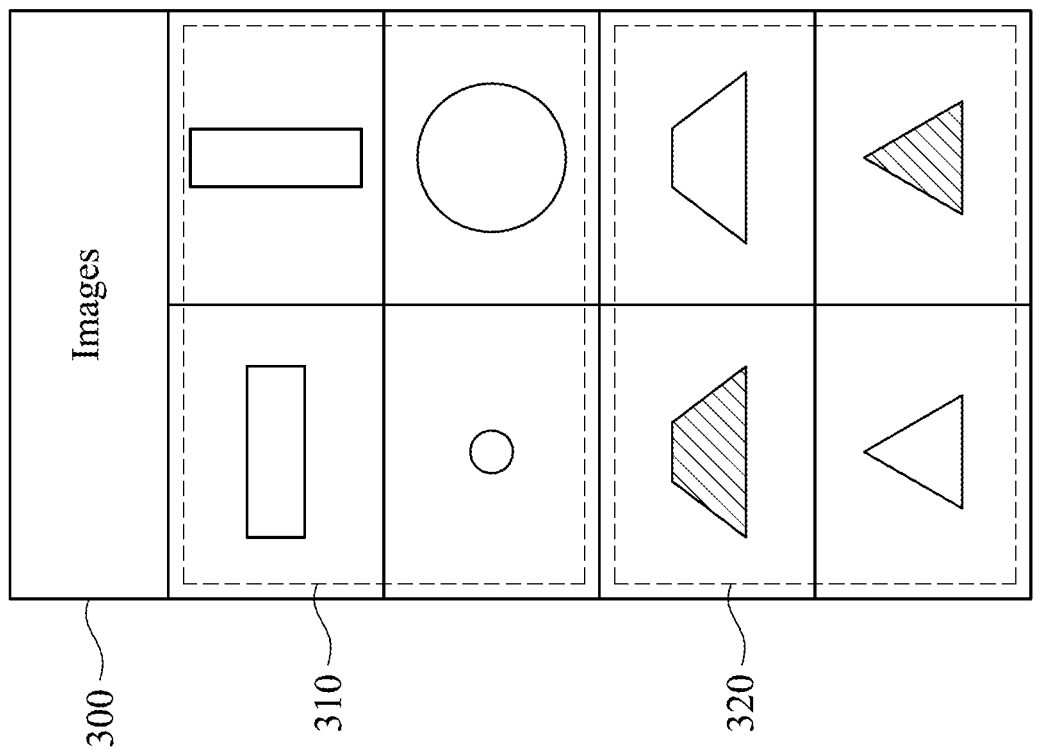
FIG. 3 is a schematic diagram of images classification, in accordance with some embodiments of the present disclosure.

Reference is now made to FIG. 1. FIG. 1 is a schematic diagram of an image processing system 100, in accordance with some embodiments of the present disclosure. As shown in FIG. 1, the image processing system 100 includes an image capturing device 110 and an image processing device 120. The image processing device 120 is coupled to the image capturing device 110. The image capturing device 110 is configured to capture multiple images 300, such as different pictures or images as shown in FIG. 3, and stream the multiple images 300 to the image processing device 120.

In some embodiments, the image capturing device 110 may be implemented by a camera of a smart phone, a picture camera or any software capable of taking screenshots.

In some embodiments, the image processing device 120 may be implemented by computer devices such as a laptop or a desktop.

In some embodiments, the image processing device 120 includes a feature extraction model 130 and an instruction library 140. The feature extraction model 130 pre-configured in the image processing device 120 is built based on IF-Net (Illumination Neural Network) of deep learning structures.

In some other embodiments, a feature descriptor generated from the feature extraction model 130 is trained based on CNN (Convolutional Neural Network) of IF-Net deep learning, and a highly adaptable descriptor may be found through learning and training. In some embodiments, the highly adaptable descriptor mentioned above may be used to improve matching proficiency when the outdoor lighting changes drastically.

In some embodiments, the instruction library 140 is stored with calculation instructions which are accessed and executed by a processor (not shown) of the image processing device 120.

Figure 2:
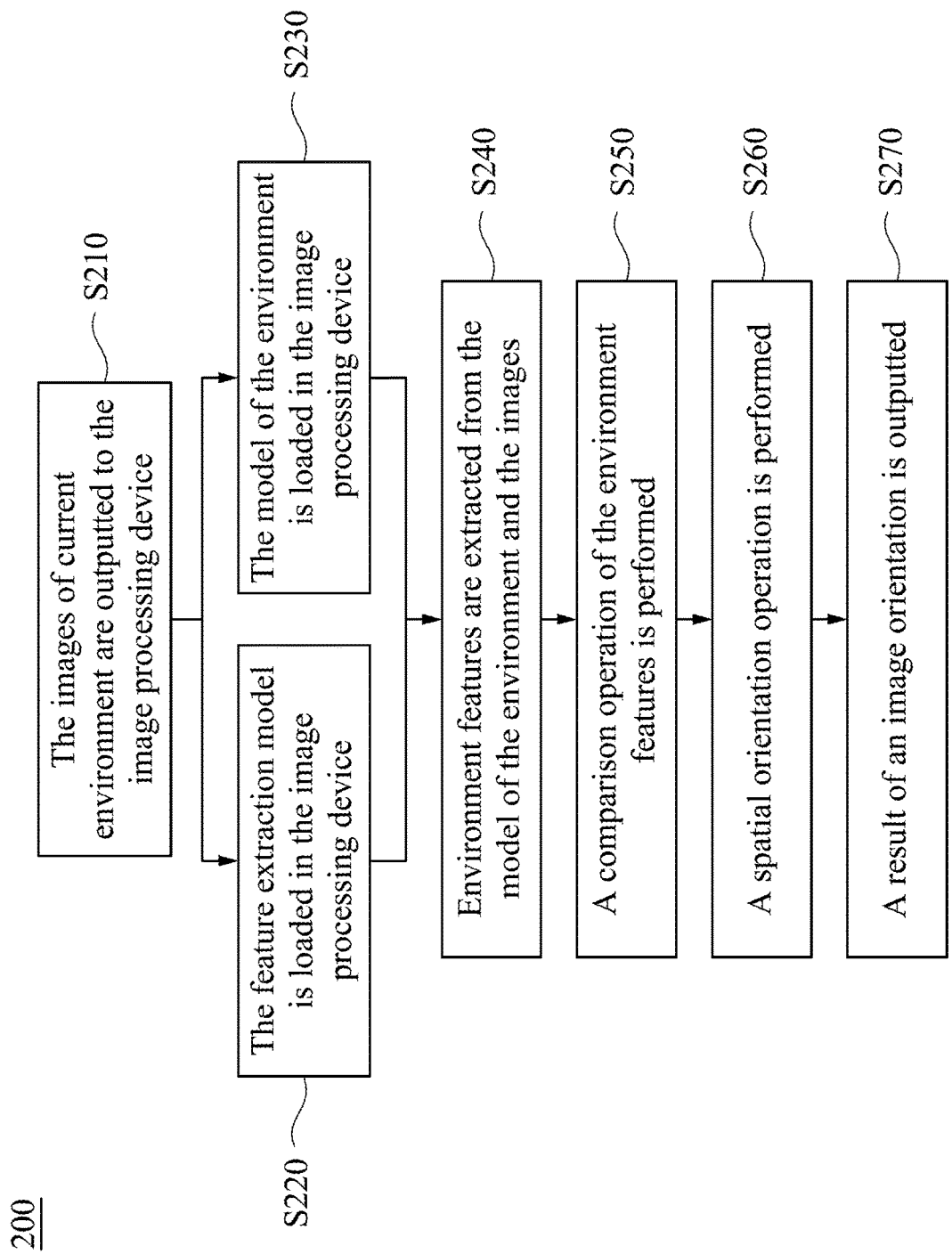
FIG. 2 is a flow chart of an operating process of the image processing system, in accordance with some embodiments of the present disclosure.

FIG. 2 is a flow chart of an operating process of the image processing system 100, in accordance with some embodiments of the present disclosure. As shown in FIG. 2, the operating process of the image processing system 100 includes step S210, S220, S230, S240, S250, S260 and S270. For the ease and clarity of illustration, the image processing method 200 shown in FIG. 2 is described in the following paragraphs by referring to FIG. 1, but is not limited as such.

In step S210, the image capturing device 110 captures images of current environment as the images 300 (as shown in FIG. 3) and outputs the images 300 to the image processing device 120. Next, in step S220, the feature extraction model 130 is loaded in the image processing device 120, and a model of the environment is loaded in step S230.

In step S240, environment features are extracted from the model of the environment and the images 300. In step S250, a comparison operation of the environment features is performed on the images 300. In step S260, the image processing device 120 performs a spatial orientation operation according to a result of the comparison operation, and outputs a result of an orientation according to a result of the spatial orientation operation in step S270.

In some embodiments, in step S240, the image processing device 120 analyzes the multiple images 300 based on the feature extraction model 130 to generate a feature vectors set corresponding to the images 300. The images 300 includes several first images 310 shown in FIG. 3 that is correlated to at least one first feature vector of the feature vectors set, and several second images 320 correlated to at least one second feature vector of the feature vectors set. Examples will be made below in accordance with FIG. 3.

FIG. 3 is a schematic diagram of images 300 classification, in accordance with some embodiments of the present disclosure. The first images 310 include images that are viewed under different observation angle or distance, and the second images 320 include images that are viewed under different lighting condition or with different brightness. The images viewed under dim light or with lower brightness are indicated by figures with slant line in FIG. 3. In other words, in some embodiments, the at least one first feature vector is correlated to at least one of an image observation angle and an image observation distance, and the at least one second feature vector is correlated to at least one of image brightness, gamma values, and contrast.

Based on above, in the application of matching environment features, the feature extraction model 130 of prior art may lead to less than expected matching results because of its low tolerance for lighting interference and field of view variation. Therefore, the present disclosure provides an image processing method to adjust the feature extraction model 130 to improve matching results.

In some embodiments, the image processing method includes selecting corresponding first training blocks and corresponding second training blocks from the first images 310 and the second images 320 respectively, by the image processing device 120 based on the feature extraction model 130. Examples will be made below in accordance with FIGS. 4A and 4B.

Figure 4A:
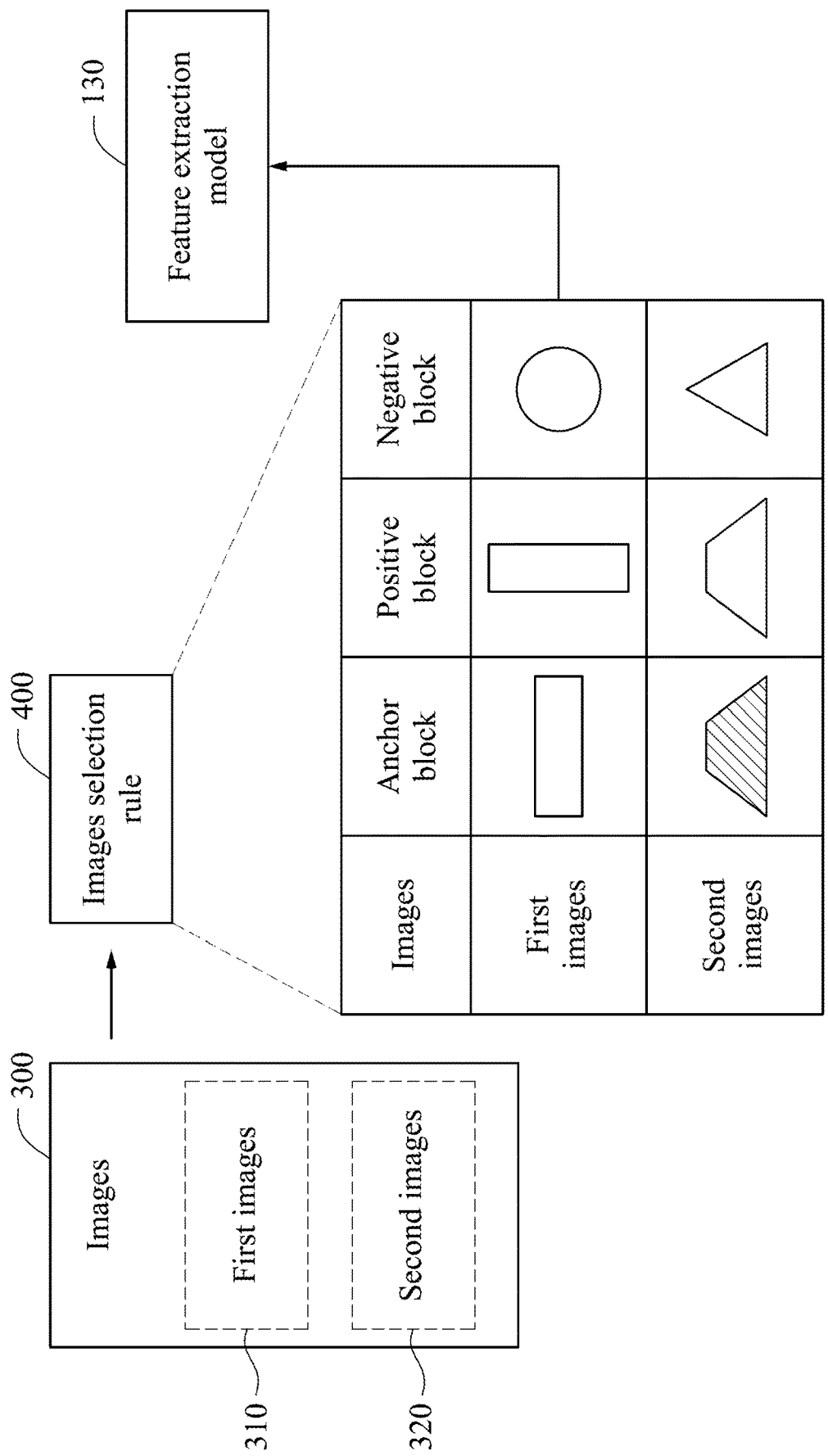
FIG. 4A and FIG. 4B are schematic diagrams of images selection rule, in accordance with some embodiments of the present disclosure.
Figure 4B:
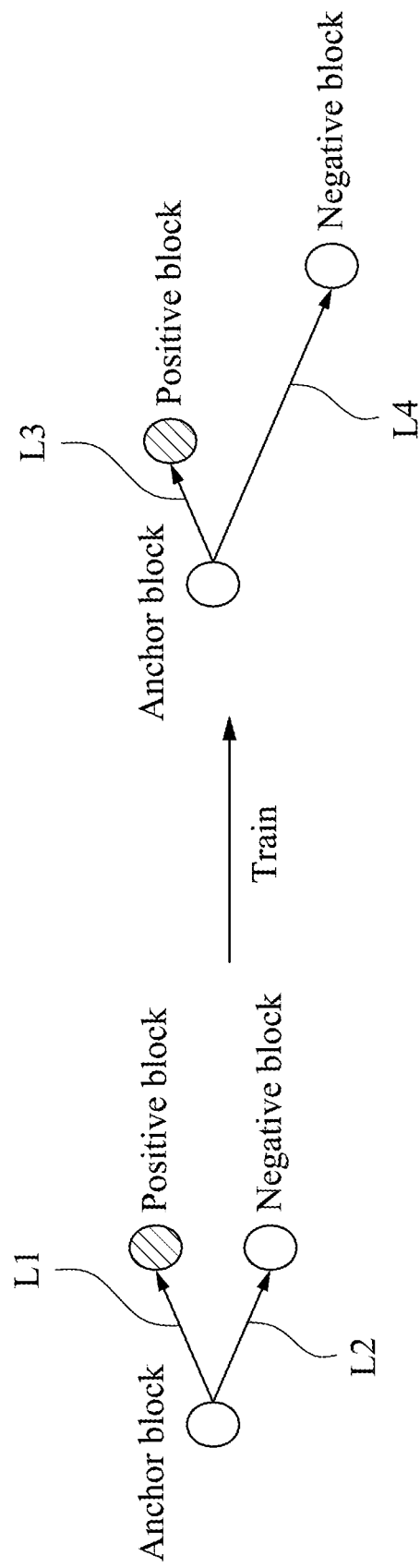

FIG. 4A and FIG. 4B are schematic diagrams of images selection rule 400, in accordance with some embodiments of the present disclosure. As shown in FIG. 4A, in some embodiments, the image processing device 120 selects the first training blocks and the second training blocks from the first images 310 and the second images 320 according to the images selection rule 400.

In some embodiments, each of the first images 310 and the second images 320 contains an anchor block, multiple positive blocks and multiple negative blocks. The positive blocks have better matching results with the anchor block. Therefore, Euclidean distances between the positive blocks and the anchor block are generally shorter. On the contrary, the negative blocks have poor matching results with the anchor block. Therefore, Euclidean distances between the negative blocks and the anchor block are generally longer.

In some other embodiments, as shown in FIG. 4B, Euclidean distance mentioned above may represent distance between different image blocks outputted by the descriptor of the feature extraction model 130. For instance, a distance between a feature vector set of the positive blocks and a feature vector set of the anchor block in a space generated by the descriptor may be Euclidean distance L1, and the distance between a feature vector set of the negative blocks and the feature vector set of the anchor block in the space generated by the descriptor may be Euclidean distance L2, in which the Euclidean distance L2 is longer than the Euclidean distance L1.

As mentioned above, in different embodiments, after training the feature extraction model 130, the distance between different image blocks outputted by the descriptor may change. For instance, the distance between the feature vector set of the positive blocks and the feature vector set of the anchor block in the space generated by the trained descriptor may be Euclidean distance L3 which is shorter than Euclidean distance L1, and the distance between the feature vector set of the negative blocks and the feature vector set of the anchor block in the space generated by the trained descriptor may be Euclidean distance L4 which is longer than Euclidean distance L2. In other words, the image processing device 120 may have higher matching proficiency based on the features extracted by the trained feature extraction model 130.

Therefore, in some embodiments, the image processing device 120 selecting the first training blocks includes selecting at least one positive block with the poorest matching result to the anchor block of the first images 310 from the positive blocks of the first images 310 as the first training blocks; and selecting at least one negative block with the best matching result to the anchor block of the first images 310 from the negative blocks of the first images 310 as the first training blocks. In other words, the first training blocks include positive blocks which have the longest Euclidean distance from the anchor block of the first images 310, and negative blocks which have the shortest Euclidean distance from the anchor block of the first images 310.

In some other embodiments, the image processing device 120 selecting the second training blocks includes selecting at least one positive block with the poorest matching result to the anchor block of the second images 320 from the positive blocks of the second images 320 as the second training blocks; and selecting at least one negative block with the best matching result to the anchor block of the second images 320 from the negative blocks of the second images 320 as the second training blocks. In other words, the second training blocks include positive blocks which have the longest Euclidean distance from the anchor block of the second images 320, and negative blocks which have the shortest Euclidean distance from the anchor block of the second images 320.

Based on the process described in the above embodiments, the distance between the anchor block and the negative blocks may be effectively maximized, and the distance between the anchor block and the positive blocks may be minimized, such that the feature extraction model 130 may generate a more representative features descriptor.

In some embodiments, the image processing device 120 executes calculation instructions in the instruction library 140 to perform calculation operation on the first training blocks and the second training blocks to generate corresponding at least one loss function value. The calculation operation mentioned above includes performing calculation, with an outlier loss function, on the first training blocks and the second training blocks to generate the at least one loss function value, in which the outlier loss function may be expressed as formula (1) below:

$$L = \frac{1}{n} \sum_{i=1}^{n} \max(m + w_p d_M(a_i, p_i) - w_n d_m(a_i, n_i), 0) \quad \text{formula (1)}$$

L is loss function value, n is a number of total image block, $w_p$ and are weight values, $d_M(a_i, p_i)$ represents the Euclidean distance between the anchor block and the positive blocks, and $d_m(a_i, n_i)$ represents the Euclidean distance between the anchor block and the negative blocks.

As expressed as formula (2) below, the weight value $w_p$ is an average of the Euclidean distance between the anchor block and the positive blocks in the same batch of images 300, and the weight value is an average of the Euclidean distance between the anchor block and the negative blocks in the same batch of images 300.

$$(w_p, w_n) = \sigma(\operatorname{mean}(\Sigma_{i=1}^{n} d_M(a_i, p_i)), \operatorname{mean}(\Sigma_{i=1}^{n} d_m(a_i, n_i))) \quad \text{formula (2)}$$

As mentioned above, if the data calculation performed in the same batch contains noises which may be outlier with respect to the training data, and the noises may affect the training proficiency. Therefore, in some embodiments, the loss function value aforementioned may reduce the noises while training the IF-Net, such that a better convergence result may be achieved for the feature extraction model 130 in the training process.

In some embodiments, the image processing method includes adjusting the feature extraction model 130 according to the at least one loss function value, such that when the image processing device 120 analyses the images 300 based on the adjusted feature extraction model 130, matching proficiency of the first images 310 and the second images 320 are increased.

In some other embodiments, adjusting the feature extraction model 130 includes inputting the first images 310 and the second images 320 to the feature extraction model 130 with shared-weight to generate different corresponding loss function values, respectively; and storing the different corresponding loss function values of the first images 310 and the second images 320, and updating at least one net parameter of the feature extraction model 130. Examples will be made below in accordance with FIG. 5.

Figure 5:
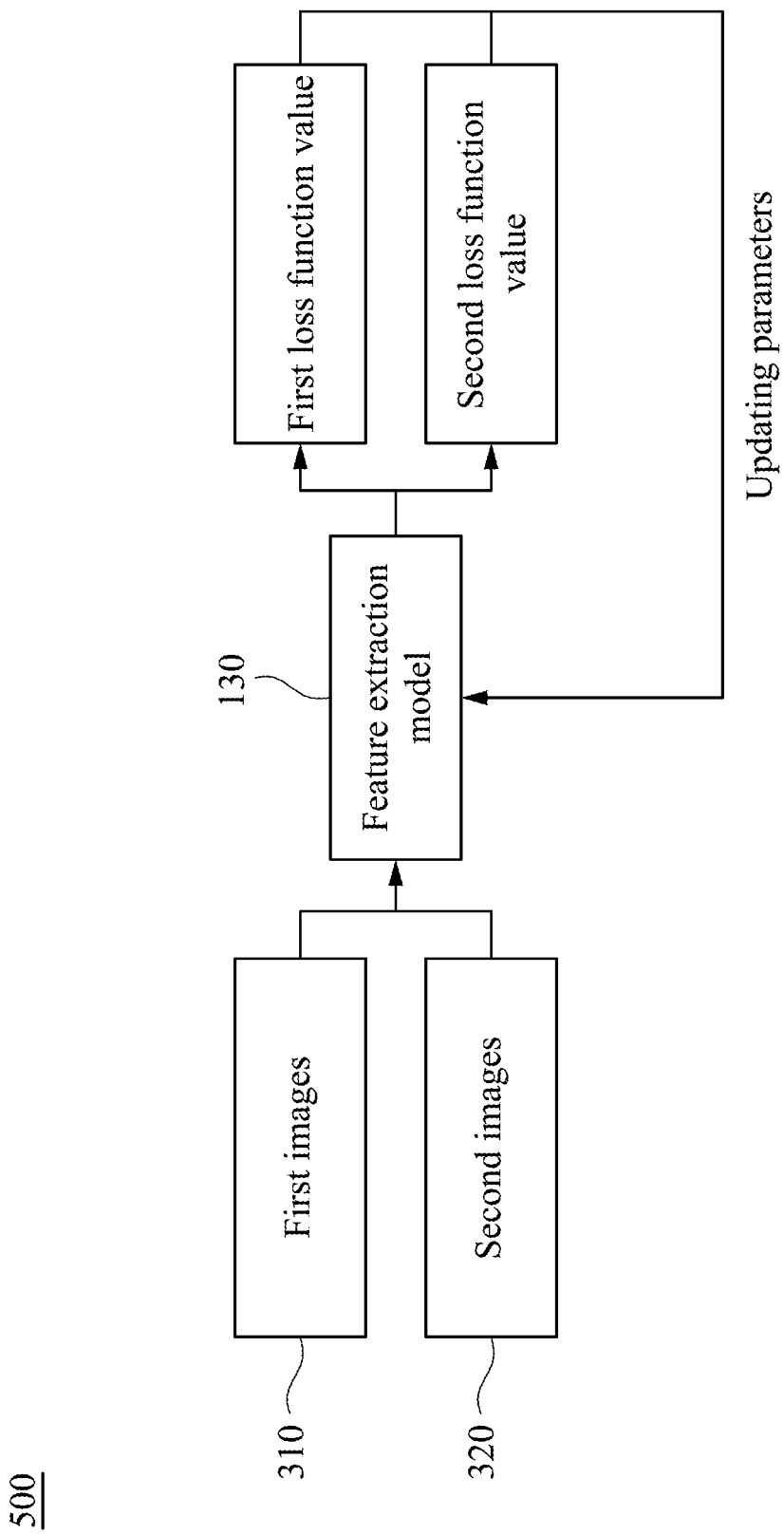
FIG. 5 is a flow chart of shared-weight process, in accordance with some embodiments of the present disclosure.

FIG. 5 is a flow chart of shared-weight process 500, in accordance with some embodiments of the present disclosure. As shown in FIG. 5, in some embodiments, the image processing device 120 accesses the calculation instructions in the instruction library 140 to perform calculation on the first images 310 to generate a first loss function value, and perform calculation on the second images 320 to generate a second loss function value. The image processing device 120 will store the first loss function value and the second loss function value, and update net parameters of the feature extraction model 130.

In some embodiments, the process of inputting the first images 310 and the second images 320 to the IF-Net with shared-weight and updating net parameters may render the feature extraction model 130 capable of processing different types of data.

In some embodiments, the image processing device 120 executes at least one of operations below based on the adjusted feature extraction model 130, such as performing the comparison operation like in step S250, performing the spatial orientation operation according to the result of the comparison operation like in step S270; and outputting the orientation result according to the result of the spatial orientation operation.

In conclusion, the matching proficiency of the image processing device 120 in step S250 may be improved based on the adjusted feature extraction model 130. Also, in step S270, the orientation result may be more precise as shown in the table (1) below. Table (1) shows various matching proficiency in accordance with embodiments of the present disclosure.

|  |  | HardNet | IF-Net |
| --- | --- | --- | --- |
| Verification | Inter | 93.85% | 93.83% |
|  | Intra | 93.53% | 93.57% |
| Retrieval |  | 60.85% | 93.57% |
| Matching proficiency |  | 41.64% | 48.65% |

In the circumstances of drastically changing in lighting or viewing scenes, the based on a ratio of the number of features extracted by the feature extraction model 130, it can be clearly seen from the table (1) that the image processing method and image processing system proposed by the present disclosure may improve matching proficiency.

While the disclosure has been described by way of example(s) and in terms of the preferred embodiment(s), it is to be understood that the disclosure is not limited thereto. Those skilled in the art may make various changes, substitutions, and alterations herein without departing from the spirit and scope of the present disclosure. In view of the foregoing, it is intended that the present invention cover modifications and variations of this invention provided they fall within the scope of the following claims.

What is claimed is:

1. An image processing method, comprising steps of:
analyzing a plurality of images, by an image processing device, based on a feature extraction model to generate a feature vectors set, wherein the plurality of images comprise a plurality of first images correlated to at least one first feature vector of the feature vectors set and a plurality of second images correlated to at least one second feature vector of the feature vectors set;
selecting corresponding first training blocks and corresponding second training blocks from the plurality of first images and the plurality of second images respectively, based on a feature extraction model, and performing calculation on the first training blocks and the second training blocks to generate at least one corresponding loss function value; and adjusting the feature extraction model according to the loss function value.

2. The image processing method of claim 1, wherein when the image processing device analysis the plurality of images based on the adjusted feature extraction model, matching proficiency of the plurality of first images and the plurality of second images are increased.

3. The image processing method of claim 1, further comprising steps of:
performing, by the image processing device, based on the adjusted feature extraction model to execute at least one of operations below:
performing a comparison operation on the plurality of first images and the plurality of second images;
performing a spatial orientation operation according to a result of the comparison operation; and
outputting an orientation result according to a result of the spatial orientation operation.

4. The image processing method of claim 1, wherein the at least one first feature vector is correlated to at least one of an image observation angle and an image observation distance, and the at least one second feature vector is correlated to at least one of image brightness, gamma values, and contrast.

5. The image processing method of claim 1, wherein selecting the first training blocks comprises steps of:
selecting, from a plurality of positive blocks of the plurality of first images, at least one positive block with the poorest matching result to an anchor block of the plurality of first images as the first training blocks; and
selecting, from a plurality of negative blocks of the plurality of first images, at least one negative block with the best matching result to the anchor block of the plurality of first images as the first training blocks.

6. The image processing method of claim 1, wherein selecting the second training blocks comprises steps of:
selecting, from a plurality of positive blocks of the plurality of second images, at least one positive block with the lowest matching result to an anchor block of the plurality of second images as the second training blocks; and
selecting, from a plurality of negative blocks of the plurality of second images, at least one negative block with the highest matching result to the anchor block of the plurality of second images as the second training blocks.

7. The image processing method of claim 1, wherein performing calculation on the first training blocks and the second training blocks comprises a step of:
performing calculation, with an outlier loss function, on the first training blocks and the second training blocks to generate the at least one corresponding loss function value.

8. The image processing method of claim 1, wherein adjusting the feature extraction model comprises steps of:
inputting the plurality of first images and the plurality of second images to the feature extraction model with shared-weight to generate different corresponding loss function values, respectively; and
storing the different corresponding loss function values of the plurality of first images and the plurality of second images, and updating at least one net parameter of the feature extraction model.

9. An image processing system, comprising:
an image capturing device configured to capture a plurality of images; and
an image processing device, coupled to the image capturing device, configured to analyze the plurality of images based on a feature extraction model to generate a feature vectors set, wherein the plurality of images comprise a plurality of first images correlated to at least one first feature vector of the feature vectors set and a plurality of second images correlated to at least one second feature vector of the feature vectors set;
wherein the image processing device selects corresponding first training blocks and corresponding second training blocks from the plurality of first images and the plurality of second images respectively, based on a feature extraction model, and performs calculation on the first training blocks and the second training blocks to generate at least one corresponding loss function value;
wherein the feature extraction model is adjusted according to the at least one loss function value generated by performing calculation on the plurality of first images and the plurality of second images.

10. The image processing system of claim 9, wherein the at least one first feature vector is correlated to at least one of an image observation angle and an image observation distance, and the at least one second feature vector is correlated to at least one of image brightness, gamma values, and contrast.

11. The image processing system of claim 9, wherein when the image processing device analysis the plurality of images based on the adjusted feature extraction model, matching proficiency of the plurality of first images and the plurality of second images are increased.

12. The image processing system of claim 9, wherein based on the adjusted feature extraction model, the image processing device executes at least one of steps of:
performing a comparison operation on the plurality of first images and the plurality of second images;
performing a spatial orientation operation according to a result of the comparison operation; and
outputting an orientation result according to a result of the spatial orientation operation.

13. The image processing system of claim 9, wherein when the image processing device selects the corresponding first training blocks, the image processing device is configured to:
select, from a plurality of positive blocks of the plurality of first images, at least one positive block with the poorest matching result to an anchor block of the plurality of first images as the first training blocks; and
select, from a plurality of negative blocks of the plurality of first images, at least one negative block with the best matching result to the anchor block of the plurality of first images as the first training blocks.

14. The image processing system of claim 9, wherein when the image processing device selects the corresponding second training blocks, the image processing device is configured to:
select, from a plurality of positive blocks of the plurality of second images, at least one positive block with the poorest matching result to an anchor block of the plurality of second images as the second training blocks; and
select, from a plurality of negative blocks of the plurality of second images, at least one negative block with the best matching result to the anchor block of the plurality of second images as the second training blocks.

15. The image processing system of claim 9, wherein when the image processing device performs calculation on the first training blocks and the second training blocks, the image processing device is configured to:
perform calculation, with an outlier loss function, on the first training blocks and the second training blocks to generate the at least one corresponding loss function value.

16. The image processing system of claim 9, wherein when the image processing device adjusts the feature extraction model, the image processing device is configured to:
input the plurality of first images and the plurality of second images to the feature extraction model with shared-weight to generate different corresponding loss function values, respectively; and
store the different corresponding loss function values of the plurality of first images and the plurality of second images, and updating at least one net parameter of the feature extraction model.

* * * * *